Dec. 9, 1969  A. L. FLANAGAN  3,483,543
INDUSTRIAL PROCESS CONTROLLER BY-PASS APPARATUS
Filed Dec. 2, 1966
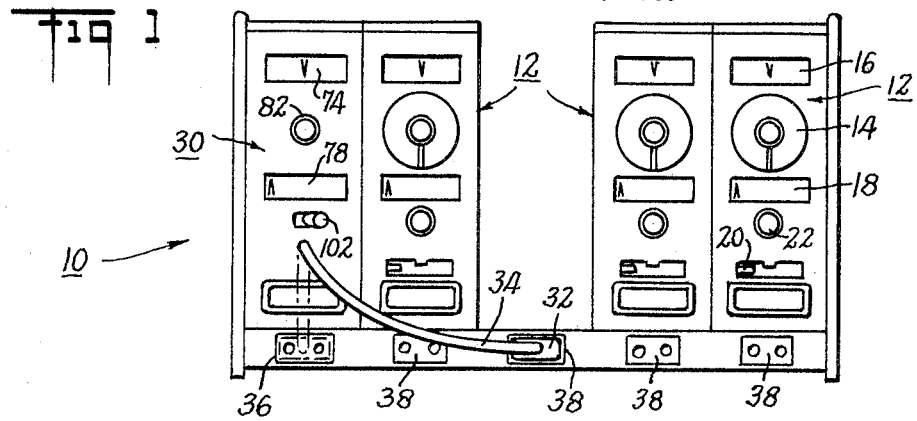
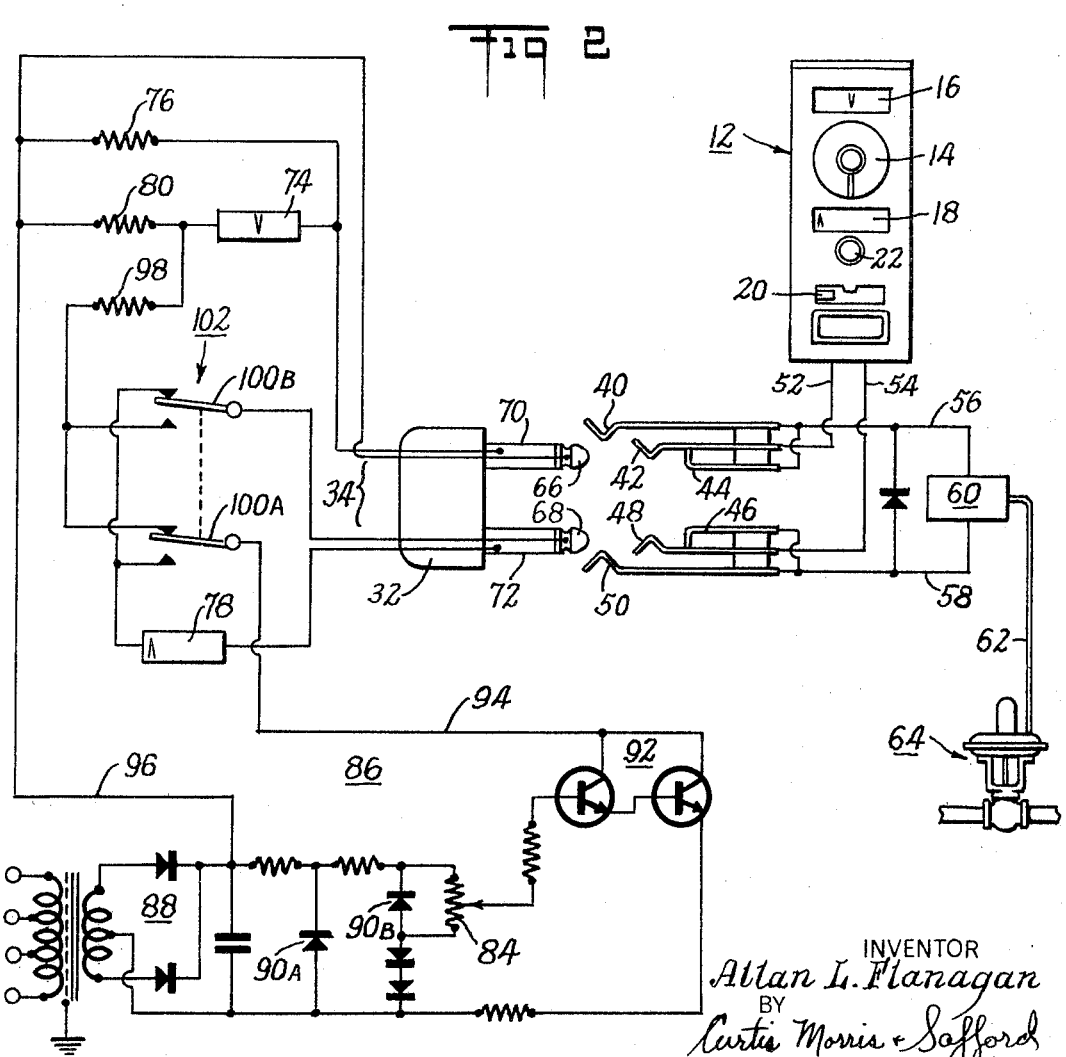
INVENTOR
Allan L. Flanagan
BY
Curtis Morris & Safford
ATTORNEYS.

United States Patent Office 3,483,543
Patented Dec. 9, 1969

3,483,543
INDUSTRIAL PROCESS CONTROLLER BY-PASS APPARATUS
Allan L. Flanagan, Attleboro, Mass., assignor to The Foxboro Company, Foxboro, Mass.
Filed Dec. 2, 1966, Ser. No. 598,830
Int. Cl. G08c 25/00; H02b 1/04, 9/00
U.S. Cl. 340—187                    10 Claims This invention relates to industrial process control systems. More particularly this invention relates to automatic process control apparatus having means for alternatively controlling the process manually when it is desired to remove the controller, e.g. for servicing or replacement.

It has been conventional for many years to provide automatic process controllers with means for manually setting the process valve, or the equivalent. For example, electronic process controllers have included a manual supply for generating an electrical signal the magnitude of which is adjustable from the front panel of the instrument. Frequently, this manual supply is independent of the amplifier and associated circuitry of the automatic controller, so that the manual supply will not be affected if there is a failure of any of the automatic control components. Some controllers have been arranged physically in such a way that the automatic control components, i.e. the amplifier and other signal-generating circuitry, could be removed without removing the manual signal components. Thus the automatic control components could be taken to a service center while leaving behind the manual signal supply for operating the process valve until repairs have been complete.

As electronic equipment design has progressed, the rate of failure of the apparatus has rapidly decreased, to the level where it is very unlikely that an automatic controller will fail. In view of that fact, it has been considered desirable to utilize the controller amplifier circuitry for producing the relatively high-powered control signal in both automatic and manual modes of operation. This simplifies the manual signal source considerably, since it is only necessary to produce a low-level signal suitable for driving the main controller amplifier. On the assumption that the controller electronics will not fail, it is safe to employ the main amplifier for producing the manual control output signal.

Although the modern solid-state electronic apparatus is, of course, highly reliable, nevertheless there always remains some possibility that the amplifier equipment or associated circuitry of a controller will fail. If the controller is so designed that the manual control signal also is produced by the controller amplifier, it will not be possible, upon such amplifier failure, to fall back on the manual adjustment controls. In some slow moving processes such failure might not be too serious a problem, because the faulty controller can be replaced by a new spare controller before the controlled process condition exceeds permissible limits. However, in other processes, such a controller failure can be quite troublesome, because loss of control over a condition of the process, even for a short time, can have serious consequences.

It is an object of this invention to provide improved process control apparatus of the general class described hereinabove. A more specific object of this invention is to provide process control apparatus having special means for furnishing a manually-adjustable signal to the process valve in the event of failure of the automatic controller. Other objects, aspects and advantages of the invention will in part be pointed out in, and in part be apparent from, the following description considered together with the accompanying drawing, in which:

FIGURE 1 shows a control panel including a number of separate controllers provided with manual signal control means in accordance with this invention; and FIGURE 2 is a schematic diagram showing the connection and switching circuitry for the manual power supply.

Referring now to FIGURE 1, there is shown an instrument panel 10 having a number of electronic process controllers 12 each adapted to control a respective process condition such as flow rate. Such controllers include (1) a set-point adjustment knob 14 adapted to very the desired level of the condition being controlled, (2) a deviation meter 16 to indicate the extent to which the process condition differs from the desired level, (3) an output meter 18 to show the signal current being transmitted to the process valve, (4) a manual-to-automatic transfer switch 20, and (5) a manual signal adjustment knob 22.

As described in detail in the above-identified copending application, the process controller 12 basically comprises a high-gain solid-state amplifier adapted to receive as an input a deviation signal (corresponding to the difference between measurement and set signals). Typically the amplifier will be provided with a negative feedback circuit having capacitive reactance to develop reset action in the output signal. When the controller is in its manual mode of operation, a manually-adjustable D.C. signal is applied to the input of the amplifier in place of the deviation signal, and the amplifier produces an output current corresponding to the magnitude of the manually-adjustable signal.

At times, it is desirable to remove one of the controllers 12, e.g. in order to service it or effect repairs. Since such removal will cut off the valve signal from the controller amplifier, on either automatic or manual operation, it may be necessary to provide other means for effecting temporary control over the process valve. To this end, there is provided in accordance with this invention a controller by-pass instrument 30, mounted in the same panel with the process controllers 12, and including means for taking over manual control of any one of the process valves normally controlled by the several associated controllers 12.

For making connection to any of the controlled process valves, the by-pass instrument 30 includes a two-element plug 32 secured to the end of a four-wire flexible cable 34. This cable is wound on a spring-loaded take-up reel (not shown) within the by-pass instrument. Normally, the plug is retained (as shown in interrupted outline) in a corresponding dummy receptacle 36 immediately beneath the by-pass instrument, wherein the cable connections are dead-ended.

When it is desired to remove one of the controllers 12 from the panel 10, the plug 32 is withdrawn from the dummy receptacle 36 and inserted in another receptacle 38 beneath the controller to be removed. This receptacle 38 includes, as shown in FIGURE 2, six leaf-spring contacts 40–50 arranged in two groups of three each, each group being cooperable with one of the two plug elements. Intermediate contacts 42 and 48 are connected directly to the controller output leads 52 and 54 respectively, while the outer contacts 40 and 50 are connected to corresponding wires 56 and 58 leading to a valve operating device, e.g. a current-to-air transducer illustrated by a block 60. When the plug 32 is not in the receptacle 38, intermediate contacts 42 and 48 are connected to outer contacts 40 and 50 by the short inner contacts 44 and 46, so as to provide a direct path for the controller output current flowing to the transducer 60. This transducer, which may be of conventional construction, is adapted to transmit through conduit 62 a corresponding pneumatic pressure signal to position a process valve 64.

When the plug 32 is inserted into the receptacle 38, the plug tips 66 and 68 engage intermediate contacts 42 and 48 to establish connection to the controller output leads 52 and 54 and to break the connection through inner contacts 44 and 46 to the transducer leads 56 and 58. Similarly, the plug sleeves 70 and 72 engage the outer contacts 40 and 50 to establish connection to the transducer leads 56 and 58.

If the controller 12 to be removed is transmitting an output current to the transducer 60, it is desirable, before switching control of the valve to the by-pass instrument 30, to adjust the output of the by-pass instrument to equal the current from the controller. For this purpose, and before switching the by-pass instrument over to control of the process valve, a voltage is developed corresponding to the controller output current and is compared, by a deviation meter 74, with a second voltage corresponding to the internal current being produced by the by-pass instrument.

More specifically, when plug 32 is first engaged with receptacle 38, circuit connections are completed through the cable 34 to couple a small resistor 76 (17 ohms) between one controller output lead 52 and one transducer lead 56. The other controller output lead 54 is connected to the corresponding transducer lead 58, this connection passing through an output meter 78. The resistance of resistor 76 is so small as not to affect significantly the amount of current produced by the controller. Thus the voltage across this resistor corresponds to the control signal, and this voltage is compared at deviation meter 74 with the voltage developed across another small resistor 80 (17 ohms) by the manual signal current being produced internally by the by-pass instrument.

A knob 82 on the front panel of the by-pass instrument 30 then is operated to vary the current flowing through resistor 80 until deviation meter 74 reads zero. This knob actuates a potentiometer 84 to adjust the output current from a power supply, generally indicated at 86, which produces the current flowing through resistor 80. This power supply comprises an A.C. rectifier 88 to develop a D.C. voltage which is filtered and regulated in the usual way by Zener diodes 90A and 90B. The output current is controlled by a cascaded emitter-follower amplifier 92, the input to which comes from potentiometer 84. This output current flows through power lines 94 and 96, resistor 80, a dummy load resistor 98 (100 ohms) and one section 100A of a manual-to-automatic transfer switch 102.

When the deviation meter 74 reads zero, the internal manual current from power supply 86 equals the controller output current. Thereupon, the automatic-to-manual switch 102 is shifted to its manual position, wherein the current from power supply 86 is directed to the transducer 60. Specifically, the direct current output of the power supply 86 passes from line 96 through resistor 76, sleeve 70, contact 40 and lead 56 to the transducer 60, and back along lead 58 to contact 50, sleeve 72, output meter 78, and through section 100A of the transfer switch 102 to power supply line 94.

Shifting transfer switch 102 to manual position also directs the output current of the controller 12 through resistor 80, the current passing from lead 52 through contact 42, plug tip 66, resistor 80, dummy load 98, switch section 100B, plug tip 68, contact 48 and lead 54 back to the controller. Thus the deviation meter 74 continues to indicate the difference between the controller output current and the current being produced by the by-pass instrument.

After the transfer to manual operation has been made, the controller 12 (now operating into dummy load 98) may be physically removed from the panel 10. Typically, the controller output circuit 52, 54 will be connected to its corresponding receptacle 38 and the valve load circuit 56, 58 through a multi-pin signal connector (not shown herein) at the back of the instrument. When the controller has been slid forward part way out of its panel position, this multi-pin connector, and the usual power plug, can be disengaged manually so that the controller can be taken all the way out, e.g. to permit removal to a service center or the like. Disconnection of the signal connector and power plug at the rear of the controller does not interfere with the supply of current from the by-pass instrument 30 to the valve load circuit 56, 58, because the by-pass instrument is connected to this load circuit through the receptacle 38 which provides a direct connection to the load circuit, independent of the controller. Consequently, the controller can be physically removed from the panel without affecting the signal being sent to the process valve.

Of course, when the controller has been slid out from its place in the panel (as shown in FIGURE 1), the controller output current flow through resistor 80 ceases, and the deviation meter 74 does not provide any useful information. However, when the controller is to be returned to service, the comparison by deviation meter 74 of the controller current and the manual power supply current from the by-pass instrument permits the controller current to be adjusted so that its output matches the manual current, thereby to prepare for switch-back to automatic operation by actuation of transfer switch 102.

Thus it will be apparent that another advantageous feature of the disclosed arrangement is that control of the process valve 64 can be transferred from the controller 12 to the by-pass instrument 30, or vice versa, without any "bump" to the process, and this is true regardless of whether the controller 12 is operating in automatic mode or in manual mode. This bumpless transfer particularly is facilitated by the provisions for comparing the alternative control signals prior to switchover by means of the deviation indicator 74 and the associated circuitry. The bypass instrument also includes the output meter 78 which provides an indication of the signal being transmitted to the process valve, thereby providing a representation of valve position for the process operator even after the controller 12 has been removed. Still another advantage of the disclosed apparatus is that the circuitry for adjusting the D-C controller by-pass signal to the valve is located wholly within the by-pass instrument 30, and thus only a single set of such circuitry need be provided for a number of controllers 12.

Although a preferred embodiment of the invention has been described hereinabove in detail, it is desired to point out that this is for the purpose of illustrating the invention so that others skilled in the art can modify it to suit particular applications; thus, the description hereinabove is not intended in a limiting sense, except as may be required by the prior art.

I claim:

1. Apparatus for use with an industrial process control system and comprising, in combination, an instrument panel carrying a plurality of process controllers each including an amplifier arranged to produce both an automatic control signal and a manually-adjustable control signal, each of said controllers being adapted to be removed as a complete entity from said panel for repair or other servicing; each of said controllers having an output circuit connected to a load circuit for conducting either of said control signals to a load device for operating a corresponding process valve or the like; a controller by-pass unit separate from said process controllers and including power supply means for developing a by-pass signal to be transmitted to a load device in place of a control signal from any one of said process controllers, thereby to permit the by-passed controller to be removed while retaining effective control of the process valve at said by-pass unit; manually-adjustable means at said by-pass unit for setting the magnitude of said by-pass signal; and by-pass control means including a connection means for each of said controllers respectively, said by-pass control means being operable between normal and by-pass conditions and including switch means serving when in said by-pass condition to disconnect the respective process controller from its load circuit and to connect the manually-adjustable by-pass signal output of said by-pass unit to that load circuit, whereby said manually-adjustable by-pass signal is directed to said load device in place of the control signal from said process controller.

2. Apparatus as claimed in claim 1, wherein said connection means comprises mating connector means having first and second parts, a first part being associated with each process controller and including conductive means connected to the output circuit of the respective controller and to the corresponding load circuit; said second part being secured to said controller by-pass unit, and contact means within said first part responsive to the engagement thereof with said second part to connect said controller by-pass unit in series with the controller output circuit.

3. Apparatus as claimed in claim 2, wherein said first part comprises a receptacle associated with each said process controller; said second part comprising a plug adapted to be inserted in any receptacle, and a cable connecting said by-pass unit to said plug.

4. Apparatus as claimed in claim 3, wherein each controller output circuit comprises first and second leads, said plug including two elements each carrying two contact points connected to corresponding circuits within said controller by-pass unit, said receptacle having contact means responsive to engagement with said plug elements and arranged when so engaged to connect said corresponding circuits in series with said first and second output leads respectively.

5. Apparatus as claimed in claim 1, wherein said connection means includes a transfer switch at said by-pass unit for shifting between automatic process controller and by-pass manual operation; comparison circuit means for comparing the outputs of said controller and said by-pass unit; said transfer switch being operable when in automatic position to direct the control signal from the process controller and the manually-adjustable by-pass signal from said power supply to said comparison circuit means; indicating means for comparing said control signal and said by-pass signal, said transfer switch being operable when shifted to manual position to direct said by-pass signal through said output circuit to said load device and to disconnect said control signal from said output circuit.

6. Apparatus as claimed in claim 5, wherein said comparison circuit means includes first and second elements of equal electrical impedance, said transfer switch being operable in said automatic position to direct said control signal to said first impedance element and to direct said by-pass signal to said second impedance element, said indicating means including meter means responsive to the difference in voltage across said impedance elements thereby to permit a comparison of said signals to allow adjustments to be made to match said by-pass signal to said control signal prior to switchover to by-pass operation.

7. Apparatus as claimed in claim 6, wherein said transfer switch in said by-pass position serves to direct said control signal to said second impedance element and said by-pass signal to said first impedance element, thereby to permit a comparison and balance adjustment prior to switchback to automatic operation.

8. Apparatus as claimed in claim 5, including a dummy load element forming part of said by-pass unit and having an impedance at least approximately matching that of said process valve load device, said transfer switch serving in said automatic position to direct said by-pass signal to said dummy load element and in said by-pass position to direct said control signal to said dummy load element, thereby to facilitate comparison of said signals prior to switching in either direction.

9. Apparatus for use with an industrial process control system and comprising, in combination, a panel having at least one process controller including an amplifier arranged to produce selectively either an automatic control signal or a manually-adjustable control signal, both of said control signals being direct-current; said controller being adapted to be removed as an entity from said panel for repair or other servicing; said controller having an output circuit connectible to a load circuit for conducting either of said control signals to a load device for operating a corresponding process valve or the like; a controller by-pass unit separate from said process controller and including a rectifier power supply for developing a direct-current by-pass signal to be transmitted to said load device in place of the direct-current control signal from said process controller, thereby to permit said controller to be removed while retaining effective control of the process valve; manually-adjustable means forming part of said by-pass unit and connected to said rectifier power supply to set the magnitude of said direct-current by-pass signal; and connection means operable between normal and by-pass conditions, said connection means including switch means serving when in said by-pass condition to disconnect the process controller output circuit from its load circuit and to connect said by-pass unit to load circuit with said manually-adjustable by-pass signal directed to said load device in place of the control signal from said process controller.

10. Apparatus as claimed in claim 9, wherein said rectifier power supply includes a transistor output stage, said manually-adjustable means comprising potentiometer means for varying the input signal to said output stage.

References Cited

UNITED STATES PATENTS 3,044,046  7/1962  Dornhoefer _____ 340—184

THOMAS B. HABECKER, Primary Examiner

U.S. Cl. X.R.

317—101; 340—210